(12) United States Patent
Riemens et al.

(10) Patent No.: US 7,961,196 B2
(45) Date of Patent: Jun. 14, 2011

(54) COST EFFECTIVE RENDERING FOR 3D DISPLAYS

(75) Inventors: Abraham Karel Riemens, Eindhoven (NL); Robert-Paul Mario Berretty, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 853 days.

(21) Appl. No.: 11/913,877

(22) PCT Filed: May 2, 2006

(86) PCT No.: PCT/IB2006/051374
§ 371 (c)(1),
(2), (4) Date: Nov. 8, 2007

(87) PCT Pub. No.: WO2006/120607
PCT Pub. Date: Nov. 16, 2006

(65) Prior Publication Data
US 2008/0252638 A1  Oct. 16, 2008

(30) Foreign Application Priority Data
May 13, 2005  (EP) .................................... 05104030

(51) Int. Cl.
G09G 5/00 (2006.01)
G09G 5/02 (2006.01)
G09G 6/10 (2006.01)
H04N 11/20 (2006.01)
H04N 5/08 (2006.01)
H04N 1/46 (2006.01)
G06K 9/40 (2006.01)
H04N 1/38 (2006.01)
G06K 9/00 (2006.01)

(52) U.S. Cl. ........ 345/581; 345/589; 345/604; 345/598; 345/690; 348/441; 348/533; 348/607; 358/512; 358/463; 358/533; 382/274; 382/167; 382/254; 382/260

(58) Field of Classification Search .......... 345/418–420, 345/428, 581, 589–591, 593–598, 603–604, 345/616, 618, 619, 660, 690, 694, 698, 427; 348/441, 469, 496, 533, 607, 683; 358/512, 358/518, 447–448, 463, 533; 382/162–167; 349/106, 75
See application file for complete search history.

(56) References Cited

U.S. PATENT DOCUMENTS

| 2003/0112863 A1 | 6/2003 | Demos |
| 2007/0109320 A1 * | 5/2007 | Skibak et al. ................. 345/611 |
| 2010/0157030 A1 * | 6/2010 | Nayar et al. ................... 348/54 |

FOREIGN PATENT DOCUMENTS

| EP | 0791847 A1 | 8/1997 |
| EP | 1437898 A1 | 7/2004 |
| WO | 9621171 | 7/1996 |
| WO | 9747142 | 12/1997 |
| WO | 9905559 | 2/1999 |
| WO | 2006077506 A1 | 7/2006 |

* cited by examiner

Primary Examiner — Wesner Sajous
(74) Attorney, Agent, or Firm — Edward W. Goodman (57) ABSTRACT

A method and apparatus for rendering image data on a 3D display is disclosed. A first image signal is received and then at least one colour component of the first image signal is rendered in reduced spatial resolution to produce a second image signal. The second image signal is spatial filtered wherein spatial errors and view errors are balanced when reconstructing a full resolution signal for the display.

19 Claims, 6 Drawing Sheets

| | X−1 | | | X | | | X+1 | | | X+2 | | | X+3 | | | X+4 | | |
|---|---|---|---|---|---|---|---|---|---|---|---|---|---|---|---|---|---|---|---|
| | (R) V | (G) Y | (B) U | (R) V | (G) Y | (B) U | (R) V | (G) Y | (B) U | (R) V | (G) Y | (B) U | (R) V | (G) Y | (B) U | (R) V | (G) Y | (B) U |
| Y−1 | 1 | 3 | 5 | 7 | 9 | 8 | 1 | 3 | 5 | 7 | 9 | 8 | 1 | 3 | 5 | 7 | 9 | 8 |
| Y | 2 | 4 | 6 | 8 | 1 | 9 | 2 | 4 | 6 | 8 | 1 | 9 | 2 | 4 | 6 | 8 |
| Y+1 | 1 | 3 | 5 | 7 | 9 | 8 | 1 | 3 | 5 | 7 | 9 | 8 | 1 | 3 | 5 | 7 | 9 | 8 |
| Y+2 | 2 | 4 | 6 | 8 | 1 | 9 | 2 | 4 | 6 | 8 | 1 | 9 | 2 | 4 | 6 | 8 | 7 | 9 |

COST EFFECTIVE RENDERING FOR 3D DISPLAYS

This invention pertains in general to the field of image signal processing. More particularly the invention relates to processing of image signals for display on 3D lenticular or barrier displays, and more particularly to preserving the perceived image quality of a signal when rendering image signals for display on 3D lenticular or barrier displays.

3D imagery is a function of binocular parallax, which provides relative depth perception to the viewer. As an image of a fixated object falls on disparate retinal points, the resulting retinal disparity provides stimulus from which the sense of stereopsis is created by the viewer's visual system. Within the visual system separate neurological sub-systems specializing in different aspects of stereopsis such as fine or coarse stereopsis, or motion-in-depth, static or lateral motion stereopsis performing in combination or separately based upon the stimulus, create a 3D image for the viewer. Various means whereby 2D images may be presented to the viewer's visual system as 3D images are currently in existence.

In WO/99/05559 a method for controlling pixel addressing of a display device to drive the display device as an multi-view auto-stereoscopic display when a lenticular screen is overlaid and image data for multiple views to be interlaced is provided. Based on data defining at least the lenticular screen lenticule pitch, and the global lenticular screen position relative to the display device, for each display colour pixel, a derivation is made as to which of the N views it is to carry. The corresponding pixel data for the assigned view is then selected as the display pixel data. Although the image quality of the multi-view display device controlled on basis of the method as described in WO 99/05559 is relatively good, the amount of signal processing needed to produce the displayed image is quite large.

Current 3D graphic systems utilizing 2D raster displays typically achieve realistic 3D effects by rendering objects on the 2D graphics raster display using perspective algorithms.

Figure 1:
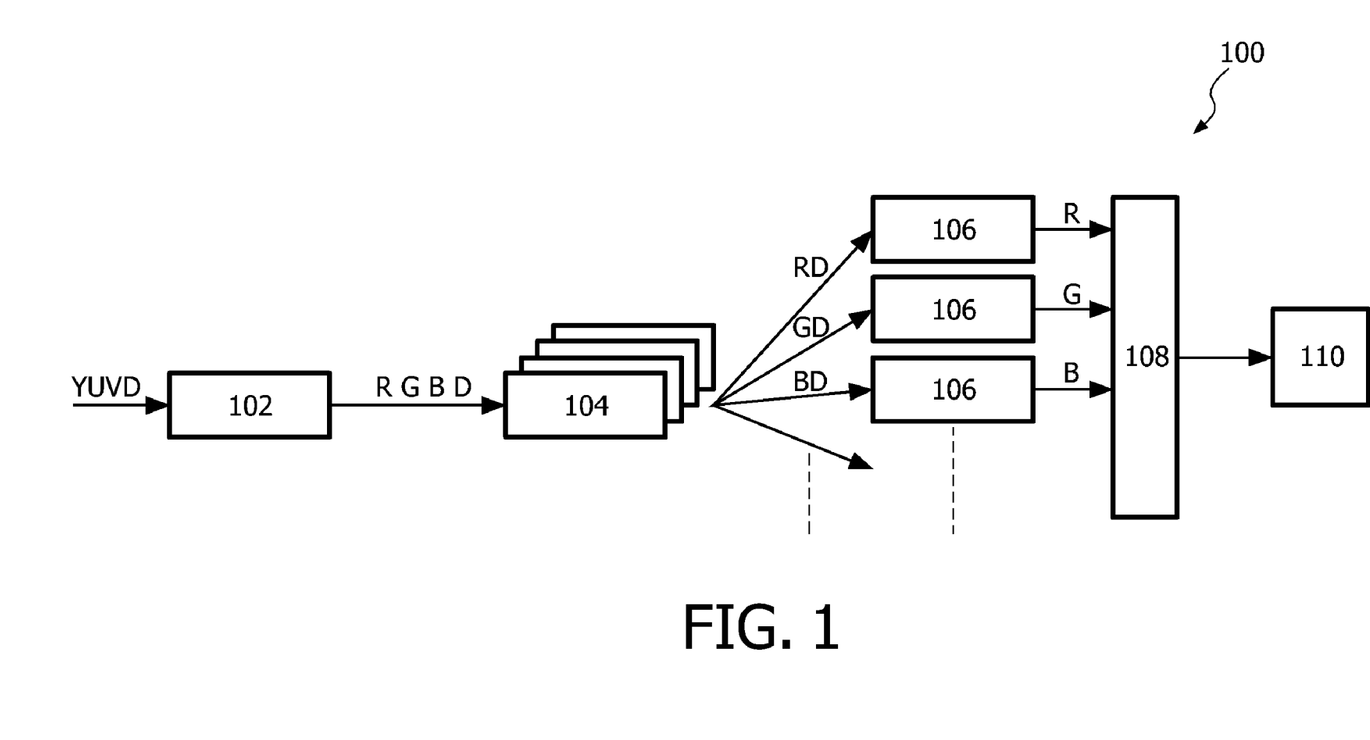
FIG. 1 illustrates a known signal processing system.

FIG. 1 illustrates a known signal processing system for rendering 2.5D video signals on 3D displays, wherein the display is constructed such that a view is mapped on individual sub-pixels. The rendering system 100 receives a YUVD signal which is converted into a RGBD signal in a known manner by a converter 102. The RGBD is then scaled by a scaler 104 into the individual R, G, B, D components. A view renderer(s) 106 then renders the RD, GD, and BD signals to produce new R, G, B signals. The view renderer 106 is instantiated 9 times. Each instantiation operates on a single colour component. The R, G, B signals are then merged back together in a merge unit 108 to produce a final RGB signal which can then be displayed on a display screen 110.

Figure 2:
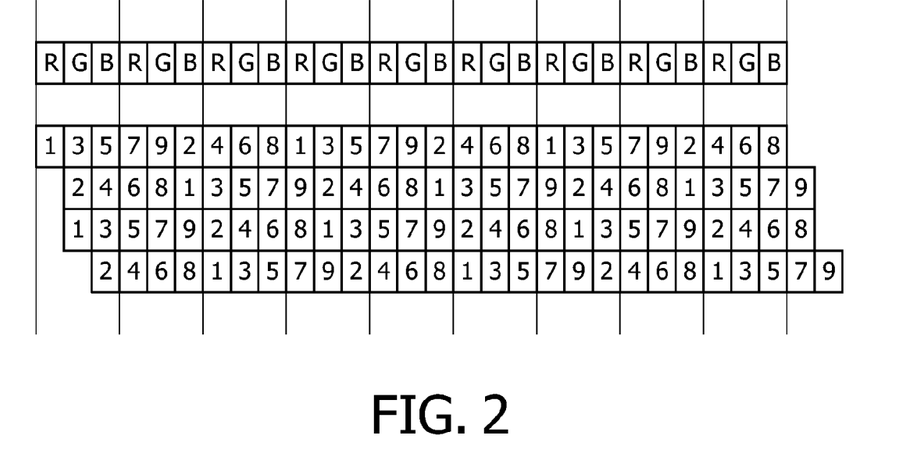
FIG. 2 illustrates view numbers on the respective subpixels for a 9-view display according to the signal processing system illustrated in FIG. 1.

FIG. 2 illustrates the view numbers on the respective sub-pixels for a 9-view display according to the signal processing system illustrated in FIG. 1. It performs two main functions: the depth transformation and resampling to generate the proper sub-pixel grid. The computational complexity of a view renderer is significant in view of current technology as it operates on sub-pixel positions of high display resolutions. Further, the computational load for each of the colour components is equal. Thus, there is a tremendous amount of computing that must be performed to render the 2.5D video signal on the 3D display. This computational load requires a significant amount of processing power and energy, since it is performed in real-time.

Hence, an improved signal processing system would be advantageous and in particular a rendering system which significantly reduces the amount of computations needed to render the image data on a 3D display while balancing spatial errors and view errors to produce a signal with acceptable image quality.

Accordingly, the present invention preferably seeks to mitigate, alleviate or eliminate one or more of the above-identified deficiencies in the art and disadvantages singly or in any combination and solves at least the above mentioned problems, at least partly, by providing a method, an apparatus, and a computer-readable medium that provides an efficient rendering of image data on a 3D display, according to the appended patent claims.

The invention aims at significant cost savings while preserving the perceived image quality when rendering image data on a 3D lenticular or barrier display. This is mainly performed by processing in the YUV domain and reduction of the U/V resolution. The view and spatial errors are balanced by novel selection of sub-pixel values in the YUV/RGB matrix. The perceived image quality is only marginally reduced. Furthermore, the processing in the YUV domain enables adaptive processing of depth dependent brightness/contrast to fit seamlessly in the processing chain. This improves the perceived depth impression. This information reduces the computational load by at least 50%.

According to aspects of the invention, a method, an apparatus, and a computer-readable medium for rendering image data on a 3D display are disclosed.

According to one aspect of the invention, a method is provided for rendering image data on a 3D display, said method comprising the steps of:
 receiving a first image signal;
 rendering at least one colour component of the first image signal in reduced spatial resolution to produce a second image signal; and
 spatial filtering said second image signal, wherein spatial errors and view errors are balanced when reconstructing a full resolution signal for the display.

According to yet another aspect of the invention, a signal processing system for rendering image data on a 3D display, comprising:
 means for receiving a first image signal;
 means for rendering at least one colour component of the first image signal in reduced spatial resolution to produce a second image signal; and
 means for spatial filtering said second image signal, wherein spatial errors and view errors are balanced when reconstructing a full resolution signal for the display.

According to yet another aspect of the invention, a computer-readable medium having embodied thereon a computer program for rendering image data for 3D display for processing by a computer, is provided, wherein the computer program comprises:
 a code segment for rendering at least one colour component of the first image signal in reduced spatial resolution to produce a second image signal; and
 a code segment for spatial filtering said second image signal, wherein spatial errors and view errors are balanced when reconstructing a full resolution signal for the display.

The present invention has the advantage over the prior art that it reduces the computational load on a rendering system while maintaining the perceived image quality of the image displayed on a 3D display.

These and other aspects, features and advantages of which the invention is capable of will be apparent and elucidated from the following description of embodiments of the present invention, reference being made to the accompanying drawings, in which.

The following description focuses on an embodiment of the present invention applicable to a video display systems and in particular to a 3D video display system. However, it will be appreciated that the invention is not limited to this application but may be applied to many other video display systems. Furthermore, the invention applies to rendering of 2.5D signals (regular video augmented with depth), stereo signals (a left-eye and right-eye regular video signal) or even rendering of multi-view (e.g. 9 images for 9-view display). In addition, the invention applies to any type of image data such as, for example, video signals, still images, etc., although the calculation load savings is more important for video since it requires real-time processing.

In the following example, a direct-view type of 3D-LCD lenticular array display device 100 having a slanted arrangement of lenticulars will be initially described with reference to FIG. 3 in order to illustrate the present invention.

It will be understood that the Figures are merely schematic and are not drawn to scale. For clarity of illustration, certain dimensions may have been exaggerated while other dimensions may have been reduced. Also, where appropriate, the same reference numerals and letters are used throughout the Figures to indicate the same parts and dimensions.

Figure 3:
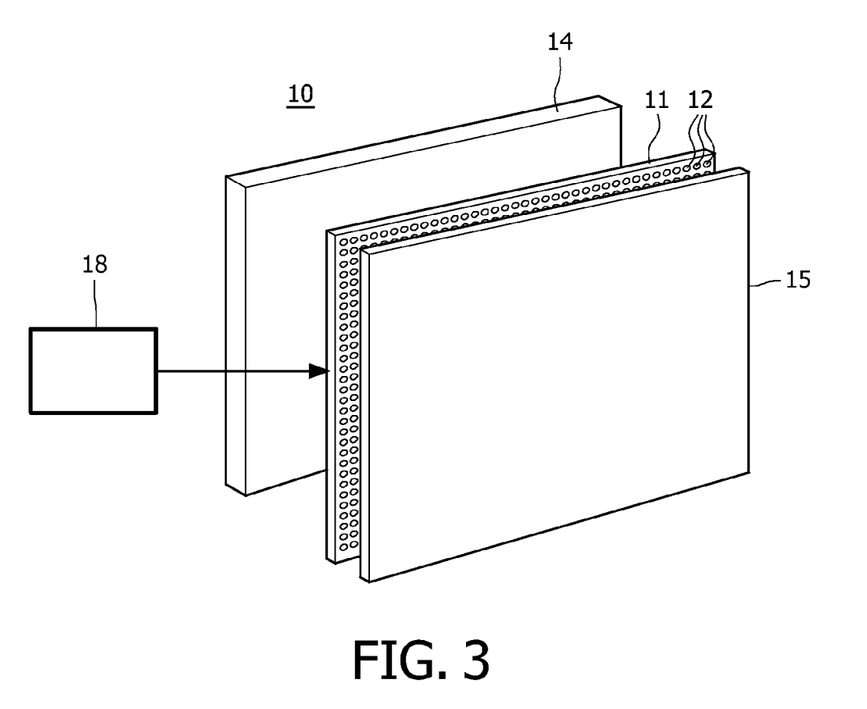
FIG. 3 illustrates a schematic perspective view of a multi-view display device which may be used with the various embodiments of the invention.

Referring to FIG. 3, the display device 10 includes a conventional LC matrix display panel 11 used as a spatial light modulator and comprising a planar array of individually addressable and similarly sized light-generating elements 12 arranged in aligned rows and columns perpendicularly to one another. While only a few light-generating elements are shown, there may, in practice, be around 800 columns (or 2400 columns in colour, with RGB triplets used to provide a full colour display) and 600 rows of display elements. Such panels are well known and will not be described here in more detail.

The light-generating elements 12 are substantially rectangular in shape and are regularly spaced from one another with the light-generating elements in two adjacent columns being separated by a gap extending in column (vertical) direction and with the display elements in two adjacent rows being separated by a gap extending in the row (horizontal) direction. The panel 11 is of the active matrix type in which each light-generating element is associated with a switching element, comprising for example, a TFT or thin film diode, TDF, situated adjacent the light-generating element.

The display panel 11 is illuminated by a light source 14, which, in this example, comprises a planar backlight extending over the area of the display element array. Light from the source 14 is directed through the panel with the individual light-generating elements being driven, by appropriate application of drive voltages, to modulate this light in conventional manner to produce a display output. The array of light-generating elements constituting the display produced thus corresponds with the structure of light-generating elements, each light-generating elements, each light-generating element providing a respective display pixel. A computing means 18 computes luminance values for the respective light-generating elements on basis of an input signal.

Over the output side of the panel 11, opposite that facing the light source 14, there is disposed a lenticular sheet 15 comprising an array of elongate, parallel, lenticules, or lens elements, acting as optical director means to provide separate images to a viewer's eyes, producing a stereoscopic display to a viewer facing the side of the sheet 15 remote from the panel 11. The lenticules of the sheet 15, which is of conventional form, comprise optically (semi) cylindrically converging lenticules, for example, formed as convex cylindrical lenses or graded reflective index cylindrical lenses. Autostereoscopic display device using such lenticular sheets in conjunction with matrix display panels are well known in the art although, unlike the conventional arrangement in such apparatus, with lenticules extending parallel to the display pixel columns (corresponding to the display element columns), the lenticules in the apparatus of FIG. 3 are arranged slanted with respect to the columns of the light-generating elements, that is, their main longitudinal axis is at an angle to the column direction of the structure of light-generating elements. This arrangement has been found to provide a number of benefits in terms of reduced resolution loss and enhanced masking of the black area between light-generating elements, as is described in the patent application with number EP-A-0791 847. The description of the operation of the display illustrated in FIG. 3 is described in patent application PHNL050033EPP which is incorporated herein by reference.

Briefly, the rendering process comprises several operations. First, an image is calculated for every view (e.g. from video+depth, or from stereo). The image is then properly scaled to the view resolution. The image is then properly shifted to the subpixel positions of the view. It will be understood by those skilled in the art that some or all of these operations may be combined. For example, as illustrated in FIG. 2, the vertical scaling is done separately and then the view renderer performs all of the horizontal processing of the three operations.

In the Human Visual System (HVS), sharpness impression is mainly determined by luminance components, significantly less by chrominance. It is suggested that this also holds for depth perception. Furthermore, consider that most of the signal energy resides in the luminance components. Further consider that colour space conversion is a relatively inexpensive operation when compared to rendering.

As the sharpness impression is mainly determined by luminance components, and the luminance is most prominent part of the G signal, the most promising candidates for reduction of vertical resolution are the B signal and in lesser extent the R signal. According to a first embodiment of the invention, the B and R components are not calculated for every line in the frame. For example, the B and R components are only calculate on every even line in the frame and a vertical average between the even lines is used to calculate the B/R signals on the odd lines. As a result, the B and/or R components have a 50% reduced vertical resolution.

Figure 4:
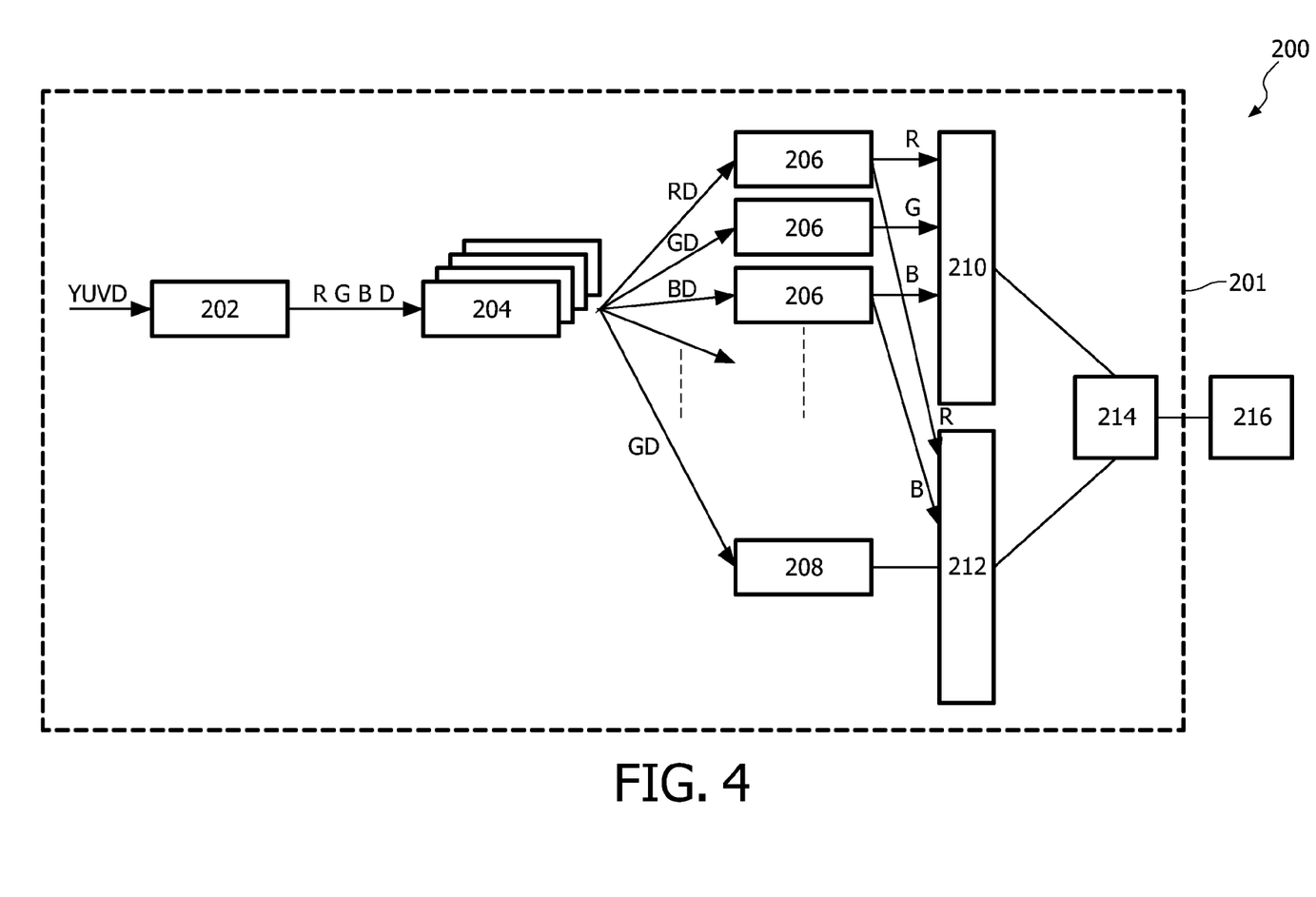
FIG. 4 illustrates a signal processing system according to one embodiment of the invention.

FIG. 4 illustrates a video signal processing system according to the first embodiment of the invention. It will be understood by those skilled in the art that the video processing system may be part of a display apparatus 200 e.g. a television, computer monitor, handheld device, etc. The rendering system 201 receives a YUVD signal, which is converted into a RGBD signal in a known manner by a converter 202. The RGBD is then scaled by a scaler 204 into the individual R, G, B, D components. In this embodiment, the RD, GD, and BD components for each even line in the frame are sent to at least one view renderer 206 to produce new R, G, B signals for the even lines. The R, G, B, signals for the even lines are then merged together in a merged unit 210. In addition, the GD component for each odd line in the frame is sent to a view renderer 208 (which behaves similar to 206) to produce a new G signal for each odd line in the frame. As will be described below in more detail, the view renderers 206, 208 spatially filter their respective output signals in such a manner so as to minimize visible artefacts caused by spatial and view errors produced during the rendering process. As described above, an average value of the R and B signals for the even lines on each side of the odd lines are then merged in the merge unit 212 with the calculated G signal to create an RGB signal of the odd lines of the frame. The RGB signals for the even and odd lines are then combined in a unit 214 to create a final RGB signal, which is sent to a display 216.

As mentioned above, the rendering process produces spatial errors and view errors. The spatial error refers to the spatial distance. The closer the spatial distance, the more correlated the sample values, so close spatial position provides minimal error. The view error refers to the view number. Large differences in view numbers relate to large disparities, hence a minimum view difference provides minimal error. A view error of 0 only allows the use of sample values from the same view, resulting in very large spatial distances and thus leads to a significant overall error. A minimal spatial error results in some cases in a very large view error resulting in very large disparities and thus leads to a significant overall error. In this embodiment of the invention, the two errors are balanced using spatial filtering resulting in good image quality.

Experiments showed that this solution yields good results. Note also that the error is not just in vertical resolution, but also in depth. A vertical offset of one line results in a 1 view error. By choosing different filter topologies, spatial accuracy may be traded for depth accuracy. Thus, the spatial filter design takes both the spatial properties and the depth properties of the display into account. According to one embodiment of the invention, a spatial filter is selected which tries to balance the correction of the spatial error with the correction of the view error so that neither error produces many visible artefacts. This solution proved to introduce hardly any visible artefacts. Since the computational load of the average operation can be neglected compared to view rendering, this reduces the computations by ⅓.

It will be understood by those skilled in the art that the invention may also be used to calculate the R, G, B values for the odd lines and use the R and B values of the odd lines to estimate the R and B values of the even lines. Furthermore, it will also be understood that the traditional calculation of R and B values for odd lines can be skipped for every other odd line, every $3^{rd}$ line, every $4^{th}$ line, etc.

Figure 5:
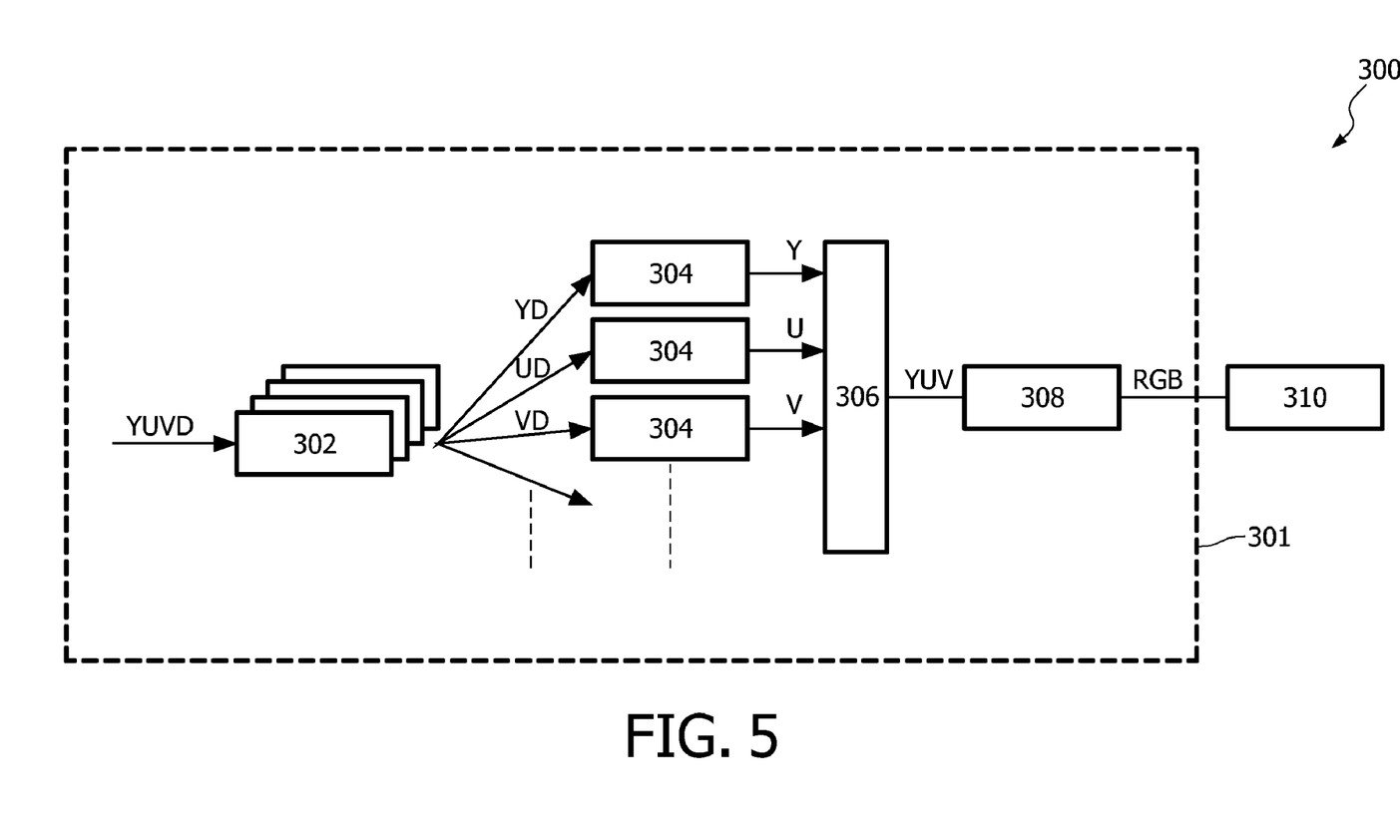
FIG. 5 illustrates a signal processing system according to another embodiment of the invention.

According to another embodiment of the invention, the rendering is performed in the YUV domain. FIG. 5 illustrates a video signal processing system according to this embodiment of the invention. It will be understood by those skilled in the art that the video processing system may be part of a display apparatus 300 e.g. a television, computer monitor, handheld device, etc. The rendering system 301 receives a YUVD signal, which is applied to a scaler 302. The YUVD signal is scaled by the scaler 302 into individual Y, U, V, D components. In this embodiment, the YD, UD, VD components are sent to a view renderer 304 to produce new Y, U, V signals. The Y, U, V signals are then merged back together in a merge unit. The merged YUV signal is then converted into an RGB signal by a converter 308. The conversion of the YUV signal to the RGB signal takes both the spatial properties and depth properties of the display into account by using a specifically chosen spatial filter as described above. The RGB signal is then sent to a display 310.

At first glance, this does not provide any cost saving while introducing an error. First, the error should be reduced as mush as possible. Later it will be shown how a reduction of the resolution of the U/V signals leads to significant cost savings. The view renderer is designed to operate on the R, G and B sub-pixel locations of the screen. For optimal mapping of YUV on these RGB locations we take the colour space conversion matrix into account; as an example, the ITU-R BT.601-5 colour matrix given by $$Y'=0.299*R'+0.587*G'+0.114*B'$$

$$U'=-0.169*R'-0.331*G'+0.500*B'$$

$$V'=0.500*R'-0.419*G'-0.081*B'$$

$$R'=Y'+1.402*V'$$

$$G'=Y'-0.344*U'-0.714*V'$$

$$B'=Y'+1.772*U'$$

Figure 6:
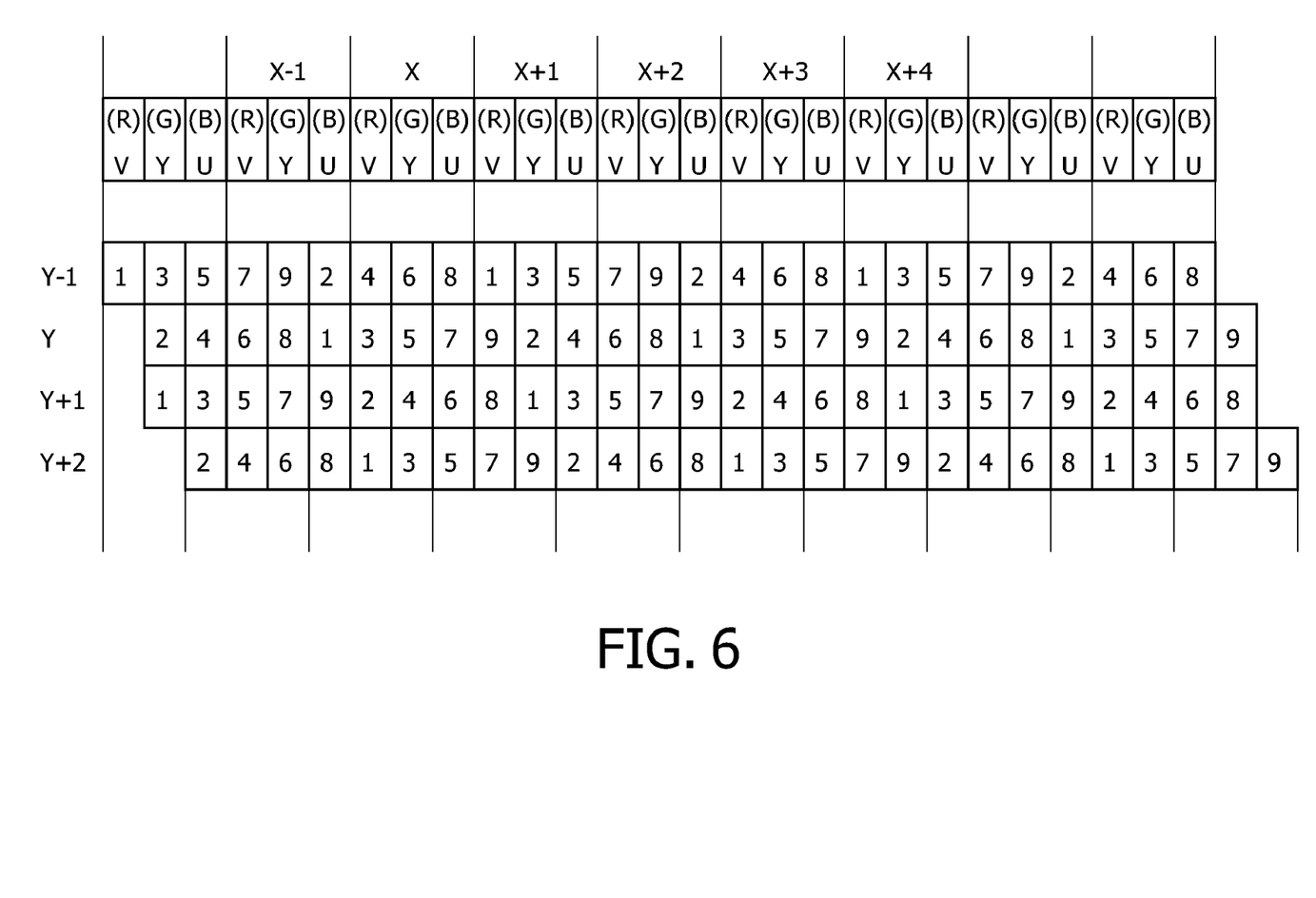
FIG. 6 illustrates view numbers on the respective subpixels for a 9-view display according to the signal processing system illustrated in FIG. 5.

It is optimal to use the most prominent colour component, hence: Y is mapped on G (i.e., it is processed as if it were a G signal); U is mapped on B, V is mapped on R. This mapping of the YUV on RGB sub-pixel locations as is shown in FIG. 6.

The conversion from YUV to RGB, yields a significant depth error unless proper precautions are taken. The most dominant contribution shall be taken from the correct location. This results in the following pixels used to calculate R, G and B:

$$R \leftarrow (Y[x+1], V[x])$$

$$G \leftarrow (Y[x], V[x-1], U[x+1])$$

$$B \leftarrow (Y[x-1], U[x])$$

where x denotes the current pixel position.

This setup results in a maximum view error of 1. Note that taking the values from neighbouring pixels ([x−1] or [x+1]) is not the closest spatial position. If only the optimal spatial position was taken into account, all values would have been taken from position [x].

Experiments have shown that this conversion results only in marginal deterioration of the perceived image quality.

As a further refinement, some filtering may be applied either using linear or statistical order filters. Examples:
For R, liner filter with Y[y,x+1] and Y[y,x−2]
For R, median filter with Y[y,x+1] and Y[y−1,x+1] and Y[y,x−2]
For B, linear filter with Y[y,x−1] and Y[y,x+2]
For B, median filter with Y[y,x−1] and Y[y+1,x−1] and Y[y,x+2]
where y denotes current line position.

Now we have obtained renderer instantiations that process U/V signals. This allows taking advantage of the reduced signal energy and bandwidth and perception sensitivity on these channels by:
executing the vertical scalar in reduced horizontal resolution (typically TV signals are 4:2:2 formatted, which reduces the amount of U/V data in the vertical scalar by 50%);

reducing the complexity e.g. number of filter tabs and reduced accuracy, of the vertical scalar;

reducing the complexity e.g. number of filter tabs and reduced accuracy, of the horizontal scalar/resampler that is part of the renderer.

Roughly, the complexity of U/V processing may be reduced at least by 50% compared to Y processing. We may neglect the fact that the YUV/RGB matrix now runs on higher data rates. Then, this results in a reduction of ⅓.

According to another embodiment of the invention, the above mentioned reduced resolution of U/V signals is exploited. Note that the input signal is usually 4:2:2 formatted, only half of the pixels in the horizontal direction should be processed during rendering. For simplicity of this explanation, we propose to execute the depth renderer on the reduced U/V resolution without any modification; simply calculating only half of the output values. Then the YUV to RGB conversion needs to be adapted, at every odd pixel position where U/V values are missing. The following data use is proposed for these odd positions:

R←(Y[y,x+1], V[y−2,x+1])

G←(Y[y,x], V[y,x−1], U[y,x+1])

B←(Y[y,x−1], U[y−2,x+1])

However, also the calculation at the even positions need to be adapted, since U/V values cannot be obtained from neighbouring pixel locations; this is a solution:

R←(Y[x+1], V[x])

G←(Y[x], V[x+2], U[x−2])

B←(Y[x−1], U[x])

This results in a maximum view error of 1. Note also that data with a vertical distance of two lines is used (not from the previous line). This allows straight forward combination of this embodiment with the first embodiment that reduced the vertical resolution by 2. Note also that the rather large spatial error of two lines is only in the U and V signals.

As a further refinement, some filtering may be applied, either using linear or statistical order filters. For example:

For R, linear filter with V[y−2,x+1] and V[y+2,x−1]

For B, linear filter with U[y−z,x+1] and U[y+2,x−1]

These pixel locations show spatial symmetry around the required pixel location.

The cost saving is immediately clear: both the vertical scaling and view renderer require only 50% of the U/V calculations. Hence, it reduces the calculations by ⅓.

An additional option in the invention is to apply depth depended signal processing. It is known from perception research the depth impression is related to brightness/contrast properties: far-away parts of a scene appear more "misty" than close-by parts. This knowledge can easily be applied in the invention at the rendering stage, since now luminance and depth information are both available at the rendering stage and depth dependent brightness/contrast adaptation can easily be obtained, e.g. by means of a variable gain (depth controlled) or a lookup-table. This results in an improved depth impression. Another example of depth dependent signal processing relates to sharpness. Often, objects in the background are out of focus. This observation can be applied in the signal processing: blurring the background improves the depth impression. Therefore depth dependent sharpness reduction may enhance the depth impression. Since sharpness impression is mainly determined by the luminance component of a video signal, it is advantageous to apply this depth dependent sharpness filter in the YUV domain. Furthermore, the current invention provides a particularly advantageous system since this depth dependent filtering can be seamlessly integrated in the rendering unit that is processing the YD signals at relatively low extra cost. The main function of the rendering is to provide a disparity depth cue to the observer. By means of dependent signal processing, additional depth cues are provided.

The various embodiments are designed for easy combination to obtain maximum savings: without even taking the simplified filters of the second embodiment into account, the first and third result both in a reduction of 50% in U/V processing, so 300% for regular RGB becomes 100% for Y and 25% for U and V respectively. This results in a total reduction of 50%.

According to another embodiment of the invention, the invention can be used in a switchable 2D/3D display where the display can be put in a mode where it operates as a regular 2D display or it can be switched to a 3D mode. As a result, the pixel selection for the YUV to RGB conversion depends on the selected 2D or 3D display mode.

Figure 7:
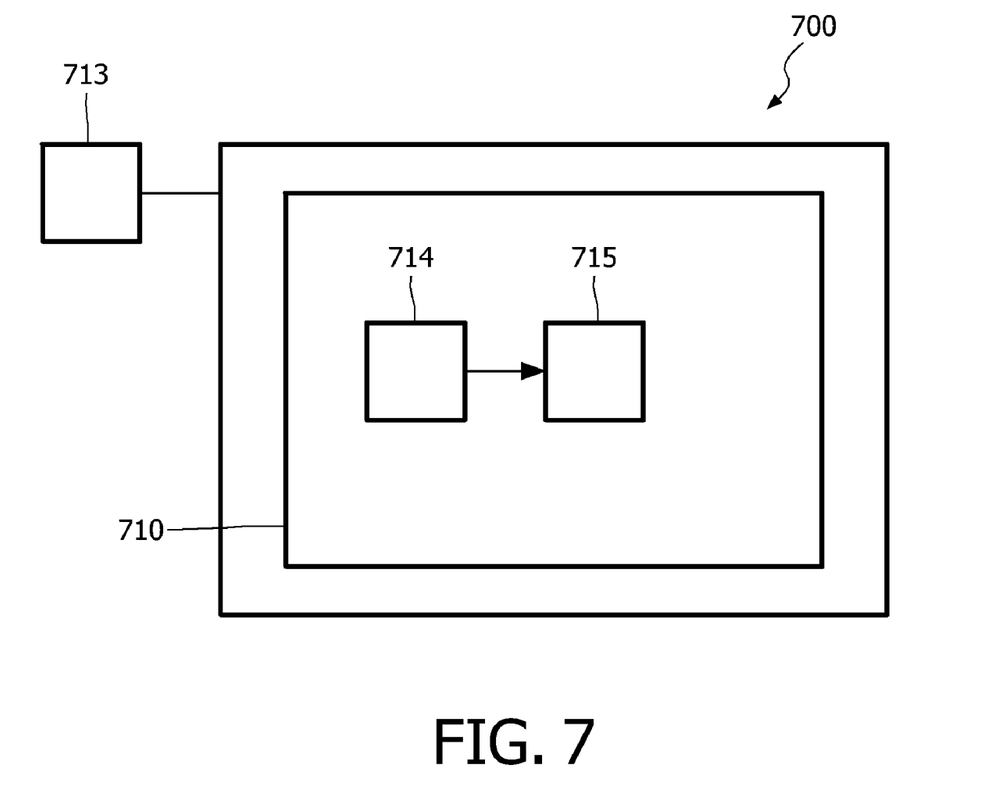
FIG. 7 illustrates a computer readable medium according to one embodiment of the invention.

In another embodiment of the invention according to FIG. 7, a computer readable medium is illustrated schematically. A computer-readable medium 700 has embodied thereon a computer program 710 for rendering video data on a 3D display, for processing by a computer 713. The computer program comprises a code segment 714 for rendering at least one colour component of the first video signal in reduced spatial resolution to produce a second signal; and a code segment 715 for spatial filtering said second video signal wherein spatial errors and view errors are balanced when reconstructing a full resolution signal for the display.

The invention can be implemented in any suitable form including hardware, software, firmware or any combination of these. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to a specific embodiments, it is not intended to be limited to the specific form set forth herein. Rather, the invention is limited only by the accompanying claims and, other embodiments than the specific above are equally possible within the scope of these appended claims, e.g. different signal processing systems than those described above.

In the claims, the term "comprises/comprising" does not exclude the presence of other elements or steps. Furthermore, although individually listed, a plurality of means, elements or method steps may be implemented by e.g. a single unit or processor.

Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for rendering image data on a 3D display, said method comprising:

receiving, by a rendering system, a first image signal;

rendering, by a converter, a scaler and a view renderer, at least one color component of the first image signal in reduced spatial resolution to produce a second image signal; and spatial filtering, in the view renderer, said second image signal, such that spatial errors and view errors are balanced when reconstructing a full resolution signal for the 3D display.

2. The method according to claim 1, comprising selecting lower resolution color components based on sensitivity of the human visual system (HVS).

3. The method according to claim 1, wherein said spatial filtering uses a spatially closest available pixel value with a maximum view error.

4. The method according to claim 1, wherein the 3D display is an RGB display and the color components with reduced spatial resolution are B and/or R components.

5. The method according to claim 1, wherein selection of a spatial filter for said spatial filtering takes into account the spatial properties and view properties of the 3D display.

6. The method according to claim 4, wherein the B and/or R components have 50% reduced vertical resolution.

7. The method according to claim 6, wherein the spatial filter comprises a vertical average operation between neighboring lines.

8. The method according to claim 1, wherein the rendering is performed in a color space different from a display color space of the 3D display.

9. The method according to claim 8, comprising applying depth dependent filtering when rendering at least one of the color components to provide additional depth cues.

10. The method according to claim 8, wherein the mapping of the components from the rendering colour space to the display color space depends on the most prominent contribution from the rendering components to the display components.

11. The method according to claim 10, wherein processing is performed in a YUV domain for an RGB display and the mapping is Y on G, U on B, and V on R.

12. The method according to claim 8, wherein the conversion of the rendering color space to the display color space takes both the spatial properties and depth properties of the display into account.

13. The method according to claim 8, wherein processing is performed in a YUV domain and the spatial resolution on the U and V signals having 50% reduced horizontal resolution.

14. The method according to claim 13, wherein resolution of the U and V signal having reduced vertical resolution.

15. The method according to claim 13, comprising performing the rendering on U and V with less accuracy than the rendering on Y.

16. The method according to claim 11, wherein pixel selection for the YUV to RGB conversion depends on selected display mode.

17. A signal processing system for rendering image data on a 3D display, comprising:
    means for receiving a first image signal;
    means for rendering at least one color component of the first image signal in reduced spatial resolution to produce a second image signal; and
    means for spatial filtering of said second image signal, wherein spatial errors and view errors are balanced when reconstructing a full resolution signal for the 3D display.

18. A display apparatus for rendering image data for a 3D display, comprising:
    means for receiving a first image signal;
    means for rendering at least one color component of the first image signal in reduced spatial resolution to produce a second image signal; and
    means for spatial filtering of said second image signal, wherein spatial errors and view errors are balanced when reconstructing a full resolution signal for the 3D display.

19. A non-transitory computer-readable medium having embodied thereon a computer program for rendering image data for 3D display for processing by a computer, the computer program comprising:
    a code segment for rendering at least one color component of the first image signal in reduced spatial resolution to produce a second image signal; and
    a code segment for spatial filtering of said second image signal, wherein spatial errors and view errors are balanced when reconstructing a full resolution signal for the display.

* * * * *